Needham & Kite,
Oil Press.
Nº 17,978. Patented Aug. 11, 1857.
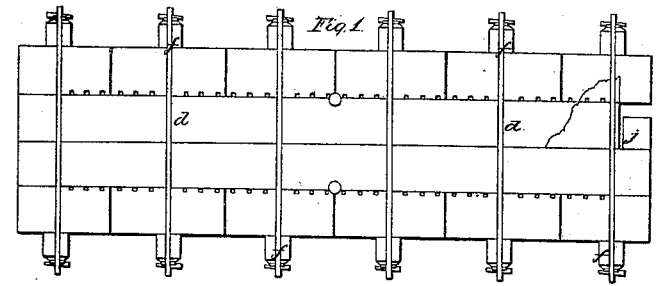
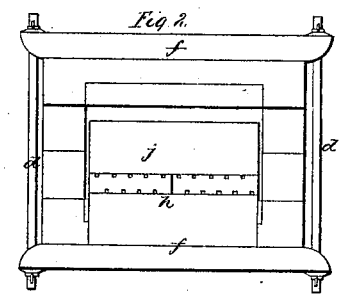
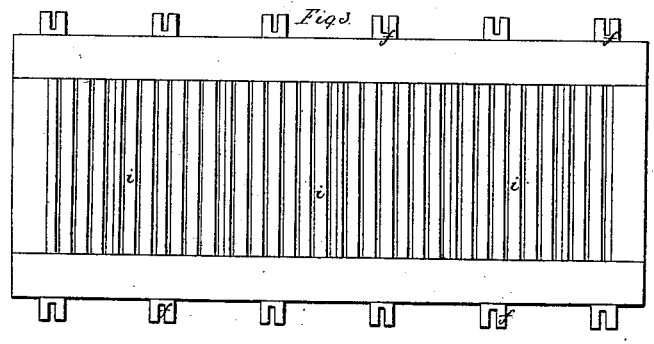
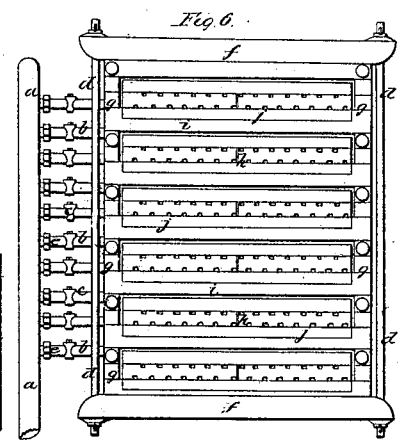
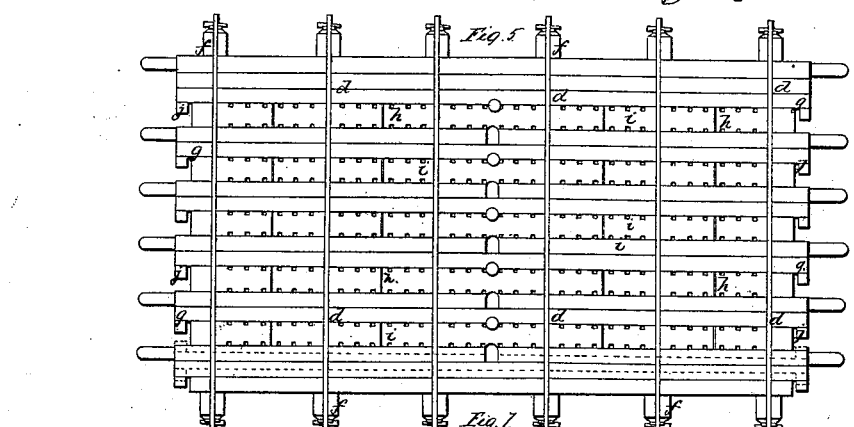
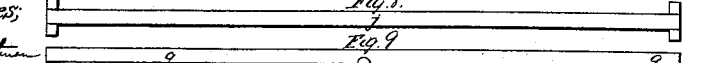
Witnesses:
Inventor,
William Needham
James Kite

UNITED STATES PATENT OFFICE.

WILLIAM NEEDHAM AND JAMES KITE, OF VAUXHALL, ENGLAND.

FILTRATION-PRESS FOR EXPRESSING LIQUIDS FROM SUBSTANCES.

Specification of Letters Patent No. 17,978, dated August 11, 1857.

*To all whom it may concern:*

Be it known that we, WILLIAM NEEDHAM and JAMES KITE, both of Vauxhall, in the county of Surrey, in that part of the United Kingdom of Great Britain and Ireland called England, engineers, have invented Improvements in Machinery or Apparatus for Expressing Liquids or Moisture from Substances; and we do hereby declare that the following is a full and exact description thereof, reference being had to the accompanying drawings and to the letters of reference marked thereon.

The nature of our invention consists in a new mode of using and operating machinery or apparatus for the purpose of expressing liquids or moisture from substances, solidifying semi-fluids holding substances in suspension or of purifying fluids. It is applicable to all manufactures where semi-fluids are to be dealt with, such as the expression of the water from white lead and colors; expressing and washing tartaric and other acids or chemicals; expressing the serum from the fiber and albumin of blood; the water from clay for potters' use; whereby greater toughness is secured, with a total absence of air, and a great saving of time and fuel; the water from clay used in the manufacture of porcelain; the water from sewage matter, whereby a cheap and profitable manure is formed; for expressing the water from distillers' spent wash, or from flax refuse, for expressing the water in the manufacture of starch and starch refuse, or oil from fatty matters; or reclaiming the soap used in the manufacture of woolens, for filtering sugar, and other matters requiring filtration or purifying; and for operating on all opaque liquids and refuse in manufactures, whereby many substances hitherto valueless are reclaimed, and, in fine, for the expression of liquid or moisture from any substances capable of being treated by or with our improved apparatus hereafter described.

In the drawing hereunto annexed, Figure 1 represents a side elevation of a double-action press, with one pair of slabs or trays only shown—Fig. 2 being an end view of the same. Fig. 3 is a plan view of the top or bottom (it being reversible at pleasure) of the slab or tray we use in our press, showing grooves (worked therein or thereon) running in a latitudinal direction. Fig. 4, shows a plan view of a center piece, termed by us (from its peculiar action) a float with grooves constructed in a longitudinal direction. Fig. 5 gives a side view of double action press, with several pairs of trays, and with several floats ranged tier above tier, constructed according to our improvements; Fig. 6, an end view of the same. Figs. 7 and 9 show two slabs or trays—Fig. 7 being the upper, and Fig. 9 the lower; these are shown thus separate, in order to the better comprehension of the Diagram number 5. Fig. 8 is the slab, which from its action within the press, we call a float; the figure representing an edge view of the said float, which rises or falls according to the working of the press.

We usually make the whole of the press of wood, except the supply pipes and cocks, and the iron tie rods and fastenings; we prefer oak for the bearers, and deal for the slabs, but we do not confine ourselves to material, as the framing might be of iron or the slabs, and floats of metal, stone, or marble, if desired; but we find the preferred materials to be cheap, durable, and to answer the purposes required of them extremely well. We would remark that the combination of material may be varied in the construction of the press for use in its operation on different substances; for some a lighter construction and finer material, with more numerous and carefully cut grooves (say rounded or curved) than can be required for the expression of moisture or liquid from coarser substances. For pressing the water from distillers' spent wash, and other similar substances, we make our press very strong, with plenty of room to allow the float to work, and to press or solidify the substantive matter introduced therein into stout cakes; such a press is represented by Figs. 1 and 2; but the slabs called floats and trays may be of any number. But when color or other lighter material is to be operated upon, a larger and more condensed press is used, constructed after the manner represented by the diagrams Figs. 6 and 7.

Between each slab or float, one, two, or more cloths or other filtering medium are placed, which cloths are attached to the short pipes $b$, $b$. The material to be acted upon having been by means of a force pump (or any other adequate means) forced up the supply pipe $a$, and through the conducting short pipes $b$, $b$, passes into the press, filling the whole vacant space or spaces thereof. When sufficient material has passed in, the stop cocks c, c, are turned off; but previous to the press being supplied with material it is necessary to arrange the slabs we call floats (one is shown in plan at Fig. 4); these are separately lifted at each end and supported by a block or blocks of wood (or other material) under the said ends by which means the slab or float will be forced in the center of the space between the trays (say one float to each pair of trays). This position of a float is shown at Fig. 5 on reference to which the dotted lines marked thereon will distinctly show how the float rests when the press is prepared for action. When the floats are so placed, and the component parts of the apparatus are fully secured together, the force pump is set to work, the cocks turned on, and the material forced into the chamber of the press until they are quite filled; the pump continuing to work until the liquid or moisture yielding to the pressure finds vent through the cloths, runs along the channels and makes its escape, leaving the more solid particles between the slabs or floats until the press refuses to receive any more; which condition will be easily ascertained by the slower speed or stoppage of the drainage from the press. When this stage is attained, each alternate upper cock is closed or shut off, when by the pressure from below the float board, will be raised. The supporting blocks are now to be taken from under the ends of the floats; the material still being forced into the lower chambers, that in the upper becomes, from the pressure more solid. At this stage after shutting off all the cocks the iron side rods d, d, are withdrawn, the pipes b, b, unscrewed at their union joints e, e, and the solid material removed from the upper chambers, leaving the cloths or bags in the said chambers empty; the side rods d, d, are then replaced, and the lower cocks are then turned off and the upper ones turned on; the material operated upon then fills the upper chambers, whereby the material is in like manner in its turn made solid and ready for removal, and the operation reversed, and so on, alternately. The foregoing series of operations being continually repeated gives at each opening of the press alternate layers or cakes of material for removal. When it is desirable to preserve the liquid or exudation issuing from the orifices of the grooves of said slabs (as in acids, oils, and similar matters) a trough or receiver of any kind should be so arranged as to intercept and retain such liquid or exudation. We have not deemed it necessary to describe such trough or receiver as any workman can affix it under the direction of the operator.

The top and bottom of our press are supplied with strong cross pieces F, f, which are kept or held in a fixed position, and pinned or otherwise fixed to the longitudinal square pieces g, which are used to obtain the necessary space for the working of the "floats." The rods d, d, with a cotter at one end and a key at the other (or two keys may be used) secure the whole apparatus together, resisting the strain on the inside of the press, and securing it from expansion in any of its parts except where such expansion has been otherwise provided for, as by the division h, between the grooved blocks i, i.

No fixed number of grooves constructed in or on the floats or trays can be given, as they may be varied to suit the requirements of particular cases, and are to be determined by the nature of the material to be operated upon, some substances allowing of greater area for pressure than others; those shown in the diagrams are square cuts, or nearly so, but there is no reason why curved or other shaped cuts should not be grooved into or constructed on the wood or other substance of which the slabs may be made, if the substance to be worked shall require such alteration of shape. On reference to Figs. 3 and 4, it will be observed that the grooves are cut into the slabs in a sense opposed to each other. Fig. 3, is a tray, and the grooves therein are cut in cross pieces of timber, and pinned or otherwise firmly secured together by long strips of wood (or other material), one on each side, of sufficient thickness to keep the trays open for the up and down motion of the floats, see Figs. 7 and 9, while the grooves on the floats, see Fig. 4, are cut longitudinally with the timber of which the slab is made, so that when placed above the trays, although both float and tray are one above the other longitudinally, multifarious squares are formed by the crossing of the grooves of the float and tray. At Figs. 5 and 6 we have shown the floats j, j, down and resting in the grooved blocks i, i, in the trays, except as before mentioned, at the dotted lines at Fig. 5, where one of the floats is thereby placed in position to receive the material from the conducting pipe when the force pump is put into operation.

We have now described a double-action press according to the mode we prefer; but in certain cases, as where ordinary hydraulic or screw presses are in use, which are in their nature ill adapted for pressing semi-fluids, we construct our slabs or floats with the cloths between the head and follower of the said hydraulic or screw presses; the semi-fluid, is thus forced into the chambers, and the same result will be effected as by the presses made in the mode hereinbefore described. In certain cases it may also be desirable to charge the chambers otherwise than by the metal pipes $b, b$, in which case we simply make a hole through each slab or float, making a corresponding hole in the cloths, to which is attached a piece of hose pipe; these pipes communicate with each chamber through the hole made in each slab or float, and are secured to each other by folding their ends together, thus forming a continuous tube. Where heat is required, the whole of the parts hereinbefore described, or any part or parts thereof, may be made hollow, so as to admit of steam or hot air.

Having now described the nature of our said invention, and shown the means by which the same is carried into practical effect, we would state that we do not claim the exclusive use of any of the parts (taken as parts) of the apparatus described and shown, but only in so far as the same is used in combination for the purposes of our invention, which we declare to be, and we claim—

The exclusive use of the combination of parts hereinbefore described forming apparatus or machinery for expressing liquids or moisture from substances.

WILLIAM NEEDHAM.
JAMES KITE.

Witnesses:
 JOHN T. PITMAN,
 T. P. CAPP.